United States Patent [19]

Long et al.

[11] Patent Number: 4,612,643
[45] Date of Patent: Sep. 16, 1986

[54] ELECTRIC GLOW DISCHARGE USING PREPULSE AND CHARGE STORAGE DEVICE

[75] Inventors: William H. Long, Torrance; Eddy A. Stappaerts, Rancho Palos Verdes; Michael J. Plummer, Rollings Hills Estates, all of Calif.

[73] Assignee: Northrop Corporation, Hawthorne, Calif.

[21] Appl. No.: 575,463

[22] Filed: Jan. 30, 1984

[51] Int. Cl.$^4$ ............................................. H01S 3/097
[52] U.S. Cl. ..................................... 372/38; 315/173; 315/208; 372/85; 372/86
[58] Field of Search ...................... 372/38, 85, 86, 81; 315/173, 174, 208

[56] References Cited

U.S. PATENT DOCUMENTS

| | | | |
|---|---|---|---|
| 4,071,806 | 1/1978 | List | 372/86 |
| 4,085,386 | 4/1978 | Farish et al. | 372/86 |
| 4,088,965 | 5/1978 | Lauderslager et al. | 372/86 |
| 4,534,035 | 8/1985 | Long | 372/85 |

OTHER PUBLICATIONS

"Water Dielectric Blumlein-Driven Fast-Electric-Discharge KrF Laser", J. I. Levatter and R. S. Bradford, Jr., Appl. Phys. Lett., 33 (8), 742–4 (1978).
"X-ray Preionization for Electric Discharge Lasers", Shao-Chi Lin, and J. I. Levatter, Appl. Phys. Letter, 34 (8) 505–8 (1979).
"Efficiency Optimization for Discharge-Excited High-Energy Excimer Laser", D. E. Rothe, C. Wallace, and T. Petach, AIP Conference, Conference Proceedings, Excimer Lasers-1983, pp. 33–44, American Institute of Physics (1983).
"Efficient Discharge Pumping of A Xecl Laser Using a High-Voltage Prepulse", W. H. Long, M. J. Plummer, and E. A. Stappaerts, Appl. Phys. Lett., 43 (8), 735–7 (1983).

*Primary Examiner*—James W. Davie
*Attorney, Agent, or Firm*—Terry J. Anderson

[57] ABSTRACT

A method and apparatus for transferring energy to a gas by means of a glow discharge. A transmission line is charged to a voltage of approximately twice that of the steady-state voltage of the glow discharge. A prepulse voltage source, having a higher voltage sufficient to initiate the glow discharge, is first connected to the discharge electrodes. After the discharge is initiated by the prepulse, the transmission line is connected and transfers its energy to the discharge. In a second embodiment, the transmission line is replaced by a capacitor.

8 Claims, 2 Drawing Figures

ELECTRIC GLOW DISCHARGE USING PREPULSE AND CHARGE STORAGE DEVICE

BACKGROUND OF THE INVENTION

1. Field of the Invention

This invention pertains to devices and methods for producing electric glow discharges, preferably for discharge pumping of gas lasers. More particularly, this invention pertains to the use of charged transmission lines or capacitors as energy sources for the discharge.

2. Description of the Prior Art

A charged transmission line is conventionally used as an energy source for discharge-pumped gas lasers. Such lasers generally include a gaseous laser gain medium within which is positioned a pair of discharge electrodes. When the charged transmission line is connected to the discharge electrodes, the voltage on the transmission line initiates a glow discharge in the gas between the electrodes, whereby a portion of the energy stored in the transmission line is transferred to the gas. Under appropriate circumstances, the energized gas will exhibit lasing action.

In most discharge-pumped lasers, the initial "firing" voltage across the discharge electrodes that is required to initiate the glow discharge is significantly greater than the "sustaining" voltage required to sustain the glow discharge thereafter, and it is commonly as much as six times greater. If, as in the prior art, the transmission line is charged to a high enough voltage to initiate or "fire" the glow discharge, the transfer of energy from the transmission line to the glow discharge will be relatively inefficient. The reason for this inefficiency will become clear from the following operational description of the prior art.

In operation, once the charged transmission line is connected to the discharge electrodes, the glow discharge initiates or "fires", and the voltage across the discharge electrodes rapidly drops to a lower steady-state or "sustaining" voltage. This rapid voltage drop causes a traveling wave to propagate along the transmission line from the end of the line connected to the discharge electrodes to the opposite, open end of the transmission line. At that point, the traveling wave is reflected and propagates back toward the discharge electrode end of the line.

The traveling wave is approximately a voltage step function whose amplitude equals the initial voltage of the charged transmission line minus the steady-state voltage of the glow discharge, and whose polarity is opposite that of the initial voltage of the transmission line.

If the voltage of the wave were approximately one-half of the initial voltage to which the transmission line was charged, the line would be completely discharged by the round trip propagation of the wave from the discharge end to the open end and return. However, in the prior art, in order to initiate the glow discharge, the transmission line is charged to an initial voltage much greater than twice the steady state voltage of the glow discharge. Consequently, in the prior art the traveling wave initially has a magnitude of much greater than one-half the initial voltage of the transmission line. The round-trip propagation of this wave from the discharge end of the transmission line to the open end and back leaves a partially charged transmission line (its polarity being reversed from the initial charge).

If the voltage remaining on the transmission line is sufficient to sustain the discharge, the transmission line may continue to transfer additional energy to the discharge. However, the energy will be transferred over an extended period of time, which results in inefficient generation of lasing action. Also, if the energy is transferred over an extended period of time, the more or less uniform glow discharge tends to break down into arcs, which do not properly excite the laser medium. When the voltage remaining on the transmission line is insufficient to sustain the glow discharge, the energy represented by the remaining voltage is left, untransferred, on the transmission line. The end result, in the prior art, is an inefficient transfer of energy from the transmission line to the glow discharge.

SUMMARY OF THE INVENTION

The present invention uses a transmission line charged to twice the steady-state voltage of an electric glow discharge to supply the energy to sustain the discharge. Since in most cases a voltage higher than twice the steady-state voltage is required to rapidly initiate or "fire" the glow discharge, a second voltage source preferably is used to provide a higher voltage prepulse to initiate the discharge. After initiation of the discharge by the prepulse, the transmission line charged to twice the steady state discharge voltage is connected to the discharge electrodes. Essentially, the total energy stored in the transmission line is then transferred to the discharge in the period of time required for a step function in voltage to propagate from the discharge end of the transmission line to the open end of the transmission line and return.

The same technique may also be used to obtain efficient energy transfer if lumped capacitors are substituted for the transmission line.

DETAILED DESCRIPTION OF THE PREFERRED EMBODIMENTS

Figure 1:
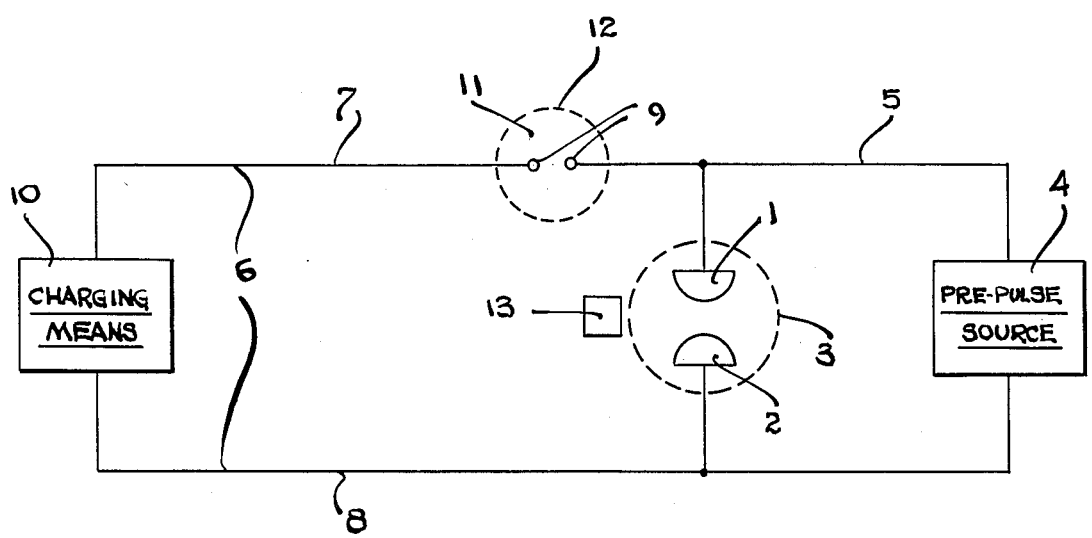
FIG. 1 is a schematic drawing of the invention as used with a charged transmission line.

In the preferred embodiment the electric glow discharge is used to transfer energy to a gaseous laser gain medium to obtain laser action. Referring to FIG. 1, two parallel discharge electrodes 1 and 2 are located within envelope 3 containing a gas 16 in which the discharge is to occur. In the tested prototype of the preferred embodiment, the gas 16 is composed of 1% HCl and 1% Xe in 4 atmospheres of neon. The active gas volume is 1.2 liters, the separation between discharge electrodes 1 and 2 is 4 centimeters, and the electrodes are each 4 cm wide and 90 cm long.

A prepulse voltage source 4 applies to the discharge electrodes 1 and 2 a high voltage pulse of sufficient amplitude and duration to initiate a glow discharge in the gas 16. In the preferred embodiment, the prepulse voltage source 4 consists of a double LC inversion circuit connected by RG-8 high voltage cable 5 to discharge electrodes 1 and 2. The prepulse voltage, or "firing voltage", generated by prepulse source 4 reaches a peak of 50,000 volts in 100 nanoseconds, which is about six times the steady-state voltage of the discharge.

Transmission line 6, comprising conductors 7 and 8, preferably uses water as the dielectric between the conductors and in the tested prototype has a characteristic impedance of approximately 0.1 ohm. High voltage source 10 charges the transmission line 6 to an initial charge of twice the steady-state discharge voltage for the glow discharge within envelope 3, this initial charge being 17,000 volts in the preferred embodiment. In a modified embodiment, two or more transmission lines may be connected in parallel to provide a lower impedance energy source.

Although transmission line 6 could be connected directly to the discharge electrodes 1 and 2, it is preferably connected via a switch 9 which remains open until the prepulse source 4 initiates the discharge. This prevents the voltage on the transmission line from firing the gas discharge prematurely.

In the preferred embodiment, switch 9 is an edge-plane rail gap consisting of a 10-mil stainless steel blade and ⅜-inch diameter brass bar separated by 6 mm. The switch dielectric 11 is air at 10 psig contained in switch envelope 12. In the preferred embodiment, the prepulse voltage from the prepulse source 4 not only initiates the discharge in envelope 3, but also initiates a breakdown of the air in switch 9, thereby "closing" the switch 9 and connecting the transmission line 6 to the discharge electrodes 1 and 2. By controlling the air pressure in switch 9, the breakdown in switch 9 is timed to occur effectively at the end of the prepulse from prepulse source 4. The energy stored in transmission line 6 is then transferred to the discharge in gas 16 in a more or less uniform manner over a period of time corresponding to the time required for a wave to propagate to the end of transmission line 6 and return.

In order to obtain a uniform glow discharge within envelope 3, rather than a breakdown into localized high-current arcs, the gas in envelope 3 may be ionized prior to application of the prepulse from prepulse source 4 by exposure of a burst of x-rays or ultraviolet radiation from an ionization source 13.

Figure 2:
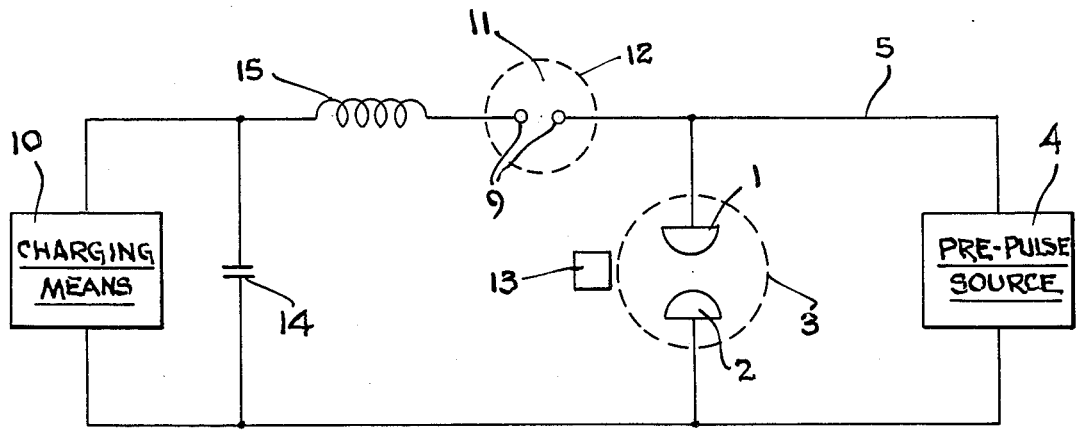
FIG. 2 is a schematic drawing of the invention as used with charged lumped capacitors.

In a second embodiment shown in FIG. 2, the charged transmission line 6 is replaced by a capacitor 14 which is charged by voltage source 10 to twice the steady-state voltage of the glow discharge.

For the purpose of explanation, lead inductance 15 is also depicted in FIG. 2. Lead inductance 15 is not a separate inductive element, but is the unavoidable inductance associated with the conductive path from capacitor 14 through switch 9 to discharge electrodes 1 and 2. Because of the lead inductance 15, when the charged capacitor 14 is connected to discharge electroces 1 and 2 by the closure of switch 9, the charge on capacitor 14 flows through discharge electrodes 1 and 2 as an oscillating current with an approximately sinusoidal waveform. In order for nearly all of the energy stored in capacitor 14 to be transferred to the glow discharge during the first half-cycle of the oscillatory current flow, the initial voltage to which capacitor 14 is charged must be approximately twice the steady-state voltage of the glow discharge. Otherwise, the energy will be transferred over an undesirably longer period of time.

For example, if capacitor 14 instead were charged to a "firing" voltage sufficient to initiate the discharge, such voltage would in most cases be much greater than twice the steady-state voltage of the glow discharge, and the transfer of energy would be undesirably slow. Accordingly, as in the first embodiment, prepulse voltage source 4 is used to first apply a higher voltage to initiate the discharge, then switch 9 is closed to connect capacitor 14 to discharge electrodes 1 and 2 after the discharge voltage has dropped to approximately its steady-state value.

The preferred embodiments described above include novel features which, although most valuable in combination with each other, also have utility individually.

One of these novel features is that the transmission line or capacitor is initially charged to twice the steady-state voltage of the glow discharge. As explained above, this feature permits a more rapid and efficient transfer of energy from the charged line or capacitor to the glow discharge.

On the other hand, although the primary advantage of using a separate prepulse voltage source is that it enables the main power source (the charged transmission line or capacitor) to be charged to a lower voltage for more efficient power transfer, the prepulse voltage source has an independent advantage. It allows the main power supply components to be built to withstand a lower voltage, thereby reducing the required size and cost of the apparatus. The prepulse voltage source may be built more economically to withstand the higher firing voltage, since it requires a much smaller energy capacity to supply power to the glow discharge only long enough to initiate the discharge.

We claim:

1. In an apparatus for producing an electrical glow discharge in a volume of gas between first and second discharge electrodes, the gas having the properties that such an electrical glow discharge can be initiated by providindg a voltage across the two discharge electrodes greater than or equal to a predetermined firing voltage and that after the glow discharge begins the voltage across the discharge electrodes decreases to a predetermined steady-state value and remains at said value as long as the glow discharge continues, the improvement comprising first and second electrical conductors arranged to form a transmission line and having an electrical capacitance therebetween, charging means for transferring to the transmission line an amount of electrical charge that produces a voltage between the two transmission line conductors equal to two times said steady-state voltage of the electric glow discharge, prepulse means for applying across the two discharge electrodes a prepulse voltage greater than or equal to said firing voltage for a time period long enough to initiate a glow discharge in said volume of gas, and switch means for connecting the transmission line to the discharge electrodes after the time at which the prepulse means first applies the prepulse voltage to the discharge electrodes.

2. An apparatus according to claim 1, wherein the prepulse means applies the prepulse voltage to the discharge electrodes after the charging means transfers said charge to the transmission line.

3. An apparatus according to claim 1, wherein the gas is a laser gain medium, and wherein the glow discharge excites the gas to produce lasing action by the gas.

4. In an apparatus for producing an electrical glow discharge in a volume of gas between first and second discharge electrodes, the gas having the properties that such an electrical glow discharge can be initiated by providing a voltage across the two discharge electrodes greater than or equal to a predetermined firing voltage and that after the glow discharge begins the voltage across the discharge electrodes decreases to a predetermined steady-state value and remains at said value as long as the glow discharge continues, the improvement comprising first and second electrical conductors arranged to form a transmission line having first end and a second end, a voltage source connected to the first end of the transmission line for producing a voltage between the two transmission line conductors equal to two times said steady-state voltage of the electric glow discharge, prepulse means for applying across the two discharge electrodes a prepulse voltage greater than or equal to said firing voltage for a time period long enough to initiate a glow discharge in said volume of gas, and switch means for connecting the transmission line to the discharge electrodes after the time at which the prepulse means first applies the prepulse voltage to the discharge electrodes.

5. In an apparatus for producing an electrical glow discharge in a volume of gas between first and second discharge electrodes, the gas having the properties that such an electrical glow discharge can be initiated by providing a voltage across the two discharge electrodes greater than or equal to a predetermined firing voltage and that after the flow discharge begins the voltage across the discharge electrodes decreases to a predetermined steady-state value and remains at said value as long as the glow discharge continues, the improvement comprising a capacitor having first and second terminals, charging means for transferring to the capacitor an amount of electrical charge that produces a voltage between the two capacitor terminals equal to two times said steady-state voltage of the electric glow discharge prepulse means for applying across the two discharge electrodes a prepulse voltage greater than or equal to said firing voltage for a time period long enough to initiate a glow discharge in said volume of gas, and switch means for connecting the capacitor terminals to the discharge electrodes after the time at which the prepulse means first applies the prepulse voltage to the discharge electrodes.

6. An apparatus according to claim 5, wherein the prepulse means applies the prepulse voltage to the discharge electrodes after the charging means transfers said charge to the capacitor.

7. In a method for producing an electrical glow discharge in a volume of gas between first and second discharge electrodes, the gas having the properties that such an electrical glow discharge can be initiated by providing a voltage across the two discharge electrodes greater than or equal to a predetermined firing voltage and that after the glow discharge begins the voltage across the discharge electrodes decreases to a predetermined steady-state value and remains at said value as long as the glow discharge continues, the improvement comprising applying a prepulse voltage across the two discharge electrodes greater than or equal to said firing voltage for a time long enough to initiate a glow discharge in said volume of gas, and thereafter applying a voltage across the two discharge electrodes equal to two times said steady-state voltage of the glow discharge.

8. A method according to claim 7 wherein the prepulse means applies the prepulse voltage to the discharge electrodes after the charging means transfers said charge to the transmission line.

* * * * *